United States Patent [19]

Sano et al.

[11] Patent Number: 4,616,804
[45] Date of Patent: Oct. 14, 1986

[54] GATE VALVE

[75] Inventors: Nichiro Sano; Hirotoshi Ogawa, both of Nobeoka, Japan

[73] Assignee: Asahi Yukizai Kogyo Co., Ltd., Miyazaki, Japan

[21] Appl. No.: 575,400

[22] Filed: Jan. 30, 1984

[30] Foreign Application Priority Data

Sep. 19, 1983 [JP] Japan ............................ 58-143690[U]

[51] Int. Cl.⁴ ........................... F16K 31/50; F16K 3/28
[52] U.S. Cl. .................................. 251/267; 251/274; 251/368
[58] Field of Search ................ 251/267, 274, 334, 368

[56] References Cited

U.S. PATENT DOCUMENTS

| | | | |
|---|---|---|---|
| 2,049,516 | 8/1936 | Ruhstorfer | 251/32 |
| 2,780,233 | 2/1957 | Volpin | 137/315 |
| 2,801,820 | 8/1957 | Green | 251/88 |
| 3,006,597 | 10/1961 | Hookway | 251/327 X |
| 3,185,437 | 5/1965 | Rice | 251/327 |
| 3,217,735 | 11/1965 | Stalter | 251/84 X |
| 3,327,992 | 6/1967 | Billeter et al. | 251/267 X |

FOREIGN PATENT DOCUMENTS

| | | | |
|---|---|---|---|
| 1174467 | 3/1959 | France | 251/274 |
| 45-6364 | 3/1970 | Japan . | |
| 58-3980 | 1/1983 | Japan . | |
| 58-36682 | 3/1983 | Japan . | |

*Primary Examiner*—Samuel Scott
*Assistant Examiner*—Allen J. Flanigan
*Attorney, Agent, or Firm*—Burns, Doane, Swecker & Mathis

[57] ABSTRACT

A gate valve comprising a valve casing having a valve chamber therein, a valve body moving up and down in the valve chamber so as to open and shut a valve passage, and a spindle engaged with the valve body and moving up and down in accordance with rotation of a handle so that the valve body moves up and down in the valve chamber. A cover is mounted above the valve chamber so as to seal and isolate the valve chamber. An upper threaded portion of the spindle passes through the cover. A guide ring having projections therearound is attached to the spindle. The projections of the ring are fitted into vertical lead grooves arranged on the inner wall of the cover.

2 Claims, 3 Drawing Figures

GATE VALVE

BACKGROUND OF THE INVENTION

(1) Field of the Invention

The present invention relates to a gate valve of the type in which a handle is rotated to move a valve body up or down within a valve chamber and thus to open or shut a passage, more particularly to a gate valve suitable for use in a large diameter passage of liquid transport piping for liquid such as slurry.

(2) Description of the Prior Art

As a gate valve suitable for liquid such as slurry, there is known a gate valve in which a valve body is screwed on a spindle. Rotation of a handle attached to the spindle moves the valve body up or down in a valve chamber to open or shut a passage of liquid transport piping (see, for example, Japanese Unexamined Utility Model Publication (Kokai) No. 58-36682).

In the above known gate valve, the valve body, which is covered with a resilient cover, is spherically shaped at the lower portion thereof and enlarges in diameter toward the upper portion. The valve body has projections at the upper end thereof for engagement with vertical lead grooves provided on the inner wall of the valve chamber, and is moved up and down by rotating the spindle screwed on the valve body.

When this gate valve is used in piping for liquids such as slurry, however, the grooves in the inner wall of the valve chamber eventually become blocked by the solid particles in the slurry. This obstructs the smooth up and down motion of the valve body opening and shutting the passage. The requisite handle torque therefore increases, and valve operation becomes difficult.

Too much blockage of grooves by the solid particles further prevents the valve body from completely descending to shut the passage. As the valve body cannot completely descend to the valve seat of the valve casing, the valve sealing efficiency decreases.

Also, entry of the solid particles into the threaded portion in which the spindle is engaged with the valve body damages the threaded portion.

SUMMARY OF THE INVENTION

The object of the present invention is to provide a gate valve able to withstand long-term usage in liquid transport piping of liquids such as slurry.

According to the present invention, there is provided a gate valve comprising a valve casing having a passage and a valve chamber which extends in a direction perpendicular to an axis of the passage, a valve body arranged in the valve chamber so as to open and shut the passage in accordance with vertical motion thereof, and a spindle engaged with the valve body and moving up and down in accordance with rotation of a handle connected with the spindle so that said valve body is moved up and down in the valve chamber. A cover is mounted above the valve chamber so as to seal and isolate the chamber. The cover is provided with an aperture at the upper end thereof and provided with vertical lead grooves on the inner wall thereof. The spindle is threaded on the upper portion thereof. A guide ring having projections therearound is attached to the spindle. The threaded portion of the spindle passes through the aperture of the cover. The projections of the guide ring fit into the vertical lead grooves of the cover.

According to a preferred embodiment, the spindle consists of a lower first spindle and an upper second spindle. The lower first spindle is made of plastic, having no threaded portion. The guide ring is attached to the upper end thereof, and a collar is attached to the lower end thereof. The collar is engaged with the valve body. The upper second spindle is made of metal and threaded thereon approximately throughout the full longitudinal length. The lower end thereof is screwed on and fixed to the upper end of the first spindle. The upper end thereof is screwed on a sleeve fixed to the handle.

DESCRIPTION OF THE PREFERRED EMBODIMENT

A preferred embodiment of the present invention will be described with reference to the accompanying drawings.

Figure 1:
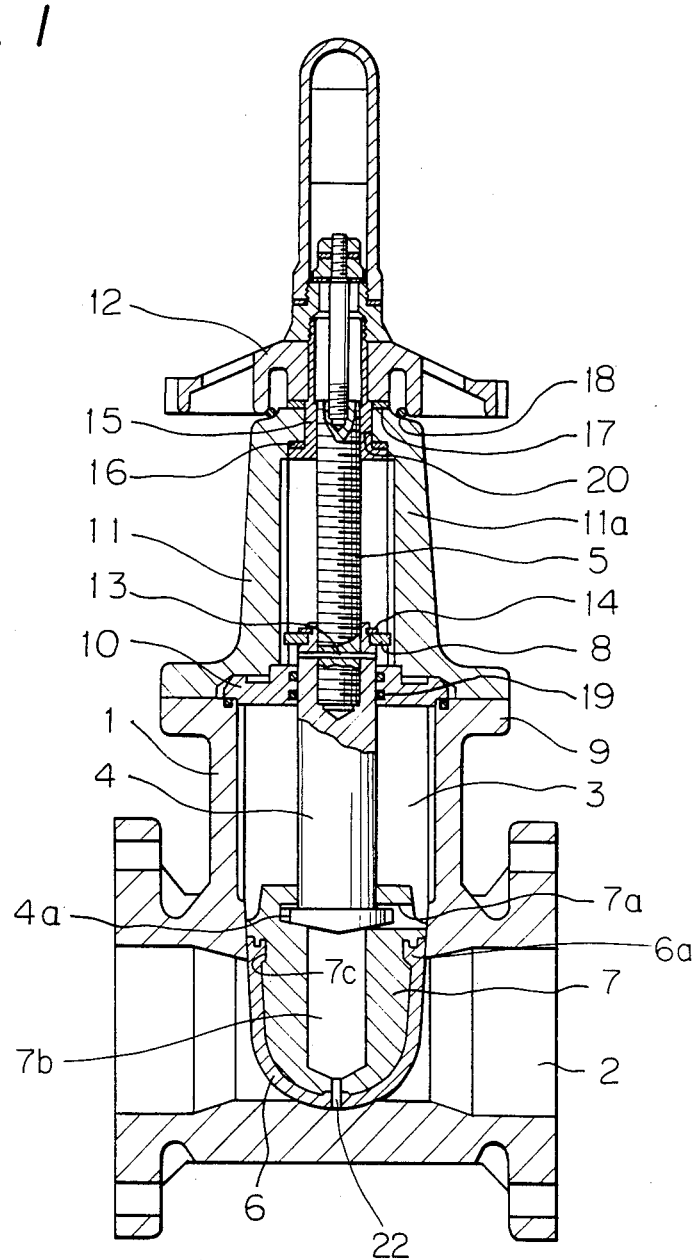
FIG. 1 is a vertical section of an embodiment of the present invention.

In FIG. 1, a valve casing generally represented by numeral 1 is made of plastic, for example, polyvinyl chloride. The casing has a passage 2 and a valve chamber 3 extending in a direction perpendicular to the longitudinal axis of the passage 2. A valve body 7, also made of plastic, opens and shuts the passage 2 of the valve casing 1 along with the up and down movement in the valve chamber 3. The valve body 7 has a cavity 7b is covered with a resilient cover 6 adhered thereto. The resilient cover has an inwardly directed annular portion 6a which fits into an annular groove 7c in the upper portion of the valve body 7. The lower end of the valve body 7 is spherically shaped. A passage 22 extends through a bottom region of resilient cover 6 and the valve body 7 and extends to the cavity 7b of the valve body. The diameter of the valve body 7 increases toward the top end thereof. In the upper portion of the valve body 7, there is provided a groove 7a.

A first spindle 4, made of plastic, is fixed to the valve body 7 not by threaded engagement, but by a collar 4a provided at the lower end of the spindle 4, which collar 4a is engaged with the groove 7a of the valve body 7 with a clearance therebetween. The fixing means between the first spindle 4 and the valve body 7 is not limited to the above. The spindle 4 may also be fixed to the valve body 7 by a knock pin, a bolt, or the like.

The upper portion of the first spindle 4 is held by a spindle support 10 via an O-ring 19. A guide ring 8 is non-rotatably fitted on the upper end of the first spindle 4 extending outside and upward from the spindle support 10, shown in FIG. 2, and is fixed to the first spindle 4 by a C-shaped snap ring 14. The guide ring 8 fits onto an axial projection 4b of the first spindle 4 which has a pair of transverse grooves 4c which receive the snap ring 14.

A second spindle 5 having a threaded portion is screwed, at the lower end thereof, on the upper end of the first spindle 4 and is fixed to the first spindle 4 by a knock pin 13.

Figure 2:
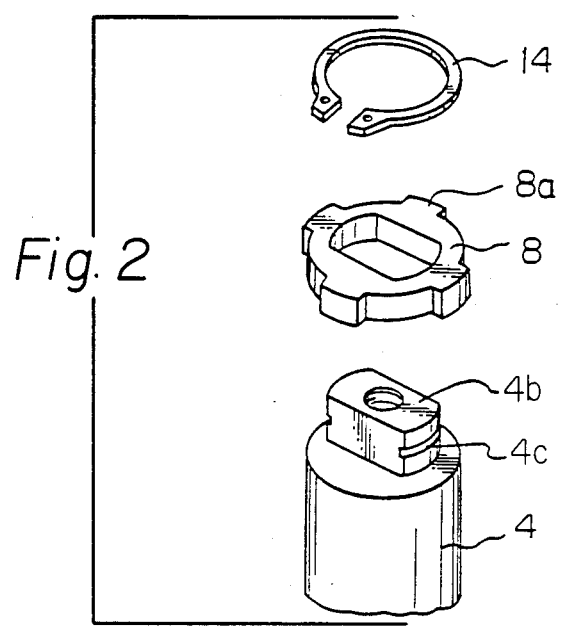
FIG. 2 is an exploded perspective view of an upper end portion of a first spindle, a guide ring, and a snap ring of the above embodiment.

The diameter of the first spindle 4 is preferably larger than that of the second spindle 5, as strength is required for the first spindle 4 in moving the valve body 7 up and down. The fitting portion of the guide ring 8 is shaped as two opposite parallel straight lines and two opposite circular arcs, as shown in FIG. 2. The shape, however, is not limited to the above and may be triangular or otherwise polygonal. The shape of the upper end of the first spindle 4 must correspond to the shape of the guide ring 8. The guide ring 8 is provided with engaging projections 8a therearound, which engage with guide grooves 11a arranged on the inner wall of a cover 11.

Thus, the first spindle 4, the second spindle 5, and the valve body 7 are prevented from rotating together and can only be moved up and down. A single projection 8a is enough to engage the first spindle 4 with the cover 11, but two to four projections are preferably provided. If two projections are provided, these projections are preferably disposed at opposite positions in the direction of the diameter of the guide ring 8. If four projections are provided, these projections are preferably disposed around the guide ring 8 at intervals of 90°. The material constructing the guide ring 8 is not especially limited, but since strength is required for the guide ring 8 to prevent the first spindle 4 from rotating, metal is preferable.

The cover 11 is made of plastic. It is shaped like an elongated cylinder, and fixed to the flange portion 9 of the upper end of the valve casing 1 by bolts and nuts (not shown) via the spindle support 10.

Figure 3:
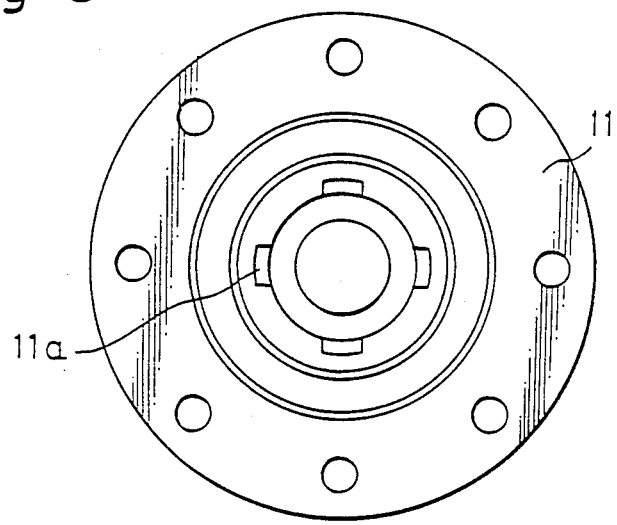
FIG. 3 is a bottom view of a cover in the above embodiment.

There are vertically provided four lead grooves 11a on the inner wall of the cover 11 (refer to FIG. 3). These lead grooves 11a engage with the engaging projections 8a of the guide ring 8 and cooperate therewith to prevent the first and second spindles 4, 5 and the valve body 7 from rotating but allow up and down movement. The cover 11 is provided with an aperture 20 at the central portion of the upper end thereof. The aperture 20 is fitted to a rotatable sleeve 15 screwed on the threaded portion of the second spindle 5 via a thrust ring 16. Thus, the cover 11 supports the second spindle 5. The elongated cylindrical cover 11 is fixed to the upper portion of the valve casing 1 and covers the metallic second spindle 5, having the threaded portion, and the metallic guide ring 8 fixed to the upper end of the first spindle 4 engaged with the valve body 7.

Therefore, the cover 11 also serves to prevent the second spindle 5 and the guide ring 8 from contact with the outside air. A handle 12 is fixed to the sleeve 15, which contacts the outer circumference of the cover 11 via a thrust ring 17 and an O-ring 18. The O-ring 18 prevents dust and rubbish from entering between the sleeve 15 and the thrust ring 17, and therefore can prevent any increase in the force required to rotate the sleeve 15 and the thrust ring 17 and, thus, the handle 12.

In the gate valve comprising the above construction, rotation of the handle 12 in the counterclockwise direction rotates the sleeve 15 in the counterclockwise direction. This raises the second spindle 5 screwed on the sleeve 15 and, thus, the first spindle 4 and the valve body 7 to open the passage 2. Conversely, rotation of the handle 12 in the clockwise direction rotates the sleeve 15 in the clockwise direction. This lowers the second spindle 5 and, thus, the first spindle 4 and the valve body 7 to shut the passage 2.

According to the present invention, since the guide ring attached to the spindle which engages the valve body, the lead grooves arranged on the inner wall of the cover which is mounted above the valve chamber, and the threaded portion of the spindle are all isolated from the valve chamber in a sealed condition, these portions of the gate valve assembly are prevented from contact with slurry, etc. Therefore, the lead grooves of the inner wall of the valve chamber and the thread groove of the threaded portion of the spindle are not blocked by the solid particles in the slurry, etc. Consequently, smooth vertical motion of the spindle and the valve body at a low handle torque can be maintained, and complete opening and shutting of the gate valve can be ensured.

Therefore, excellent valve sealing efficiency, especially valve shutting, can be kept for a long time.

Further, since the guide ring and the threaded portion of the spindle, which are both usually made of metal, are covered and prevented from contact with the outside air, there is no danger of rusting of these parts of the gate valve and, thus, the life of these parts can be extended.

We claim:

1. A gate valve capable of handling slurries, comprising:

a plastic valve casing having a passage and a valve chamber which extends in a direction perpendicular to a longitudinal axis of said passage, the valve chamber communicating with the said passage and being open at its upper end;

a valve body arranged in said valve chamber such that the up and down movement of the body is effective to open and shut said passage, the valve body being covered with a resilient cover, said resilient cover having an upper portion with an integrally formed, inwardly directed annular projection fitted into an annular groove located at an upper peripheral portion of the valve body, said valve body having a cavity, said valve body and resilient cover having spherical bottom portions with a passage extending through said bottom portions to said cavity, and a spindle engaged with said valve body at a lower end of said spindle and arranged to move up and down in dependence on rotation of a handle coupled with said spindle, whereby handle rotation is effective to move the valve body up and down in said valve chamber;

a plastic hollow cover mounted over the upper end of the valve chamber, the hollow cover being provided with an aperture at an upper end thereof and being formed with vertical lead grooves on an inner wall thereof;

a spindle support member isolating the valve chamber from the interior of the hollow cover;

the spindle comprising a lower first spindle and an upper second spindle, said lower first spindle being constructed from plastic, said upper second spindle being made of metal and having a threaded portion, said first spindle sliding through in a sealed manner through the spindle support member from the valve chamber into the interior of the cover;

a guide ring having projections, said guide ring being attached to an upper end of said first spindle, said projections of said guide ring engaging with said vertical lead grooves of said hollow cover, said first spindle including an axial projection at its upper end, said guide ring fitted onto said axial projection so as to be interlocked against rotation relative to said first spindle, said axial projection provided with a snap ring which engages a transverse groove on an upper region of said axial projection so as to secure said guide ring to said axial projection;

said threaded portion of said second spindle passing through said aperture of said cover.

2. The gate valve as claimed in claim 1, wherein said cover prevents said second spindle and said guide ring from contact with outside air.

* * * * *